US011202169B2

(12) United States Patent
Isgar

(10) Patent No.: US 11,202,169 B2
(45) Date of Patent: Dec. 14, 2021

(54) SOCIAL COMMUNICATION SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

(21) Appl. No.: 16/985,026

(22) Filed: Aug. 4, 2020

(65) Prior Publication Data
US 2021/0044924 A1 Feb. 11, 2021

Related U.S. Application Data

(60) Provisional application No. 62/882,691, filed on Aug. 5, 2019.

(51) Int. Cl.
*H04W 4/02* (2018.01)
(52) U.S. Cl.
CPC .................................. *H04W 4/023* (2013.01)
(58) Field of Classification Search
CPC ..... H04W 4/023; H04W 4/029; H04W 4/021; H04W 4/06
USPC ...................................................... 455/456.3
See application file for complete search history.

(56) References Cited

U.S. PATENT DOCUMENTS

| 2011/0225069 | A1 | 9/2011 | Cramer et al. | |
| 2014/0108530 | A1* | 4/2014 | Papakipos | G06Q 30/08 709/204 |
| 2015/0189026 | A1* | 7/2015 | Cohen | H04W 4/21 709/204 |
| 2017/0156026 | A1 | 6/2017 | Reudink | |

\* cited by examiner

*Primary Examiner* — Ted M Wang
(74) *Attorney, Agent, or Firm* — Schmeiser, Olsen & Watts LLP

(57) ABSTRACT

Described is a social communication system. The system includes a server having a memory storing user data and a user computing device coupled to the server. The server may be programmed to receive and process a signal that the user computing device has accessed the system and send for display on the user computing device other users that are accessing the system and within a predetermined proximity of the user computing device. The system allows users to communicate anonymously through a communication interface.

5 Claims, 8 Drawing Sheets

SOCIAL COMMUNICATION SYSTEM

CROSS REFERENCE TO RELATED APPLICATION

This application claims priority to U.S. Provisional Patent Application to Charles Isgar entitled "SOCIAL COMMUNICATION SYSTEM," Ser. No. 62/882,691, filed Aug. 5, 2019, the disclosures of which are hereby incorporated entirely herein by reference.

BACKGROUND OF THE INVENTION

Technical Field

This invention generally relates to a system for social communication, and more specifically to a system for anonymous social communication.

State of the Art

There are several instances where an individual may have a desire to communicate with another individual that is within a certain proximity to the individual. For example, on a road trip, in a line or in other circumstances when people like to communicate. Further, many people enjoy getting to know new people but lack the confidence to get to know someone when they have to interact face-to-face or in other similar circumstances. There lacks a system that allows users to communicate with each other anonymously.

Accordingly, what is needed is a system for anonymous social communication between users within proximity to each other.

SUMMARY OF THE INVENTION

An embodiment includes a social communication system comprising: a server having a memory storing user data; and a user computing device coupled to the server, wherein the server is programmed to: receive a signal from the user computing device that has accessed the system, wherein the signal includes user data having location information of the user computing device; in response to receiving the signal from the user computing device, process the user data and determine various users that have accessed the system and are within a predetermined proximity to the user computing device; create and send for display on the user computing device a selectable element on the user interface for each of the various user; receive a signal from the user computing device having communication data in response to selecting at least one user from the various users displayed on the user interface on the user computing device; process the selection and sending for display on the user computing device, a communication interface for communicating between the user computing device and the selected user.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Embodiments of the present invention relate to a system for anonymous social communication. The system may include the use of a mobile application operating on a user computing device that may be a mobile computing device like a smartphone, a tablet, a wearable, and the like; and/or the system may operate on any type of computing device as a downloadable application or even as a web application.

Figure 1:
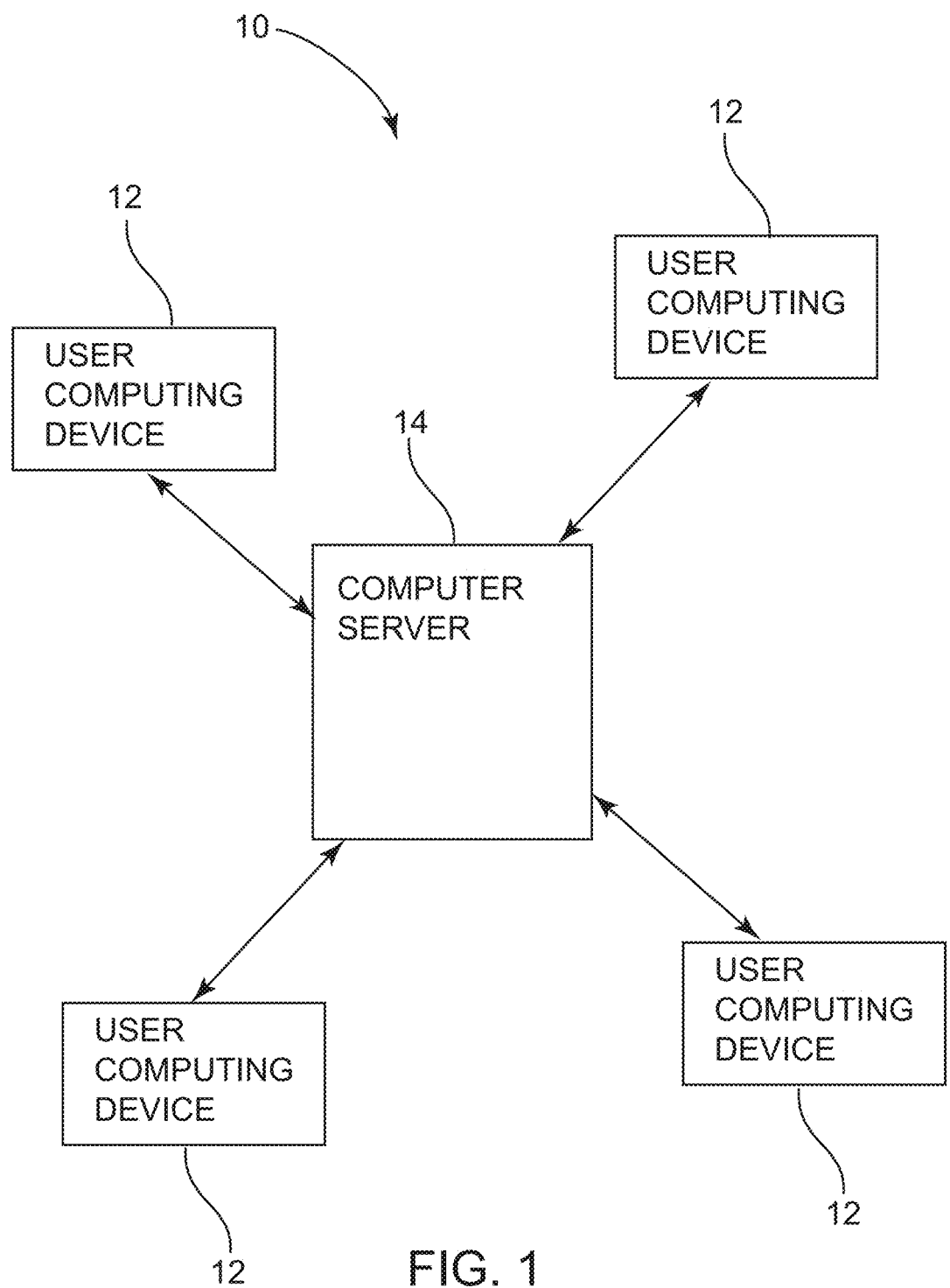
FIG. 1 a diagrammatic view of a social communication system according to an embodiment.

FIG. 1 depicts an embodiment of a social communication system 10. The system 10 may include user computing devices 12 and a server 14, wherein each user computing device 12 is coupled to the computer server 14. This coupling may be a network connection, such as a wireless connection through an Internet connection, a Wi-Fi connection, a Bluetooth connection or the like, wherein the user computing devices 12 may communicate with and receive communication from the server 14. The user computing device 12 may be a desktop computer, a laptop, a tablet, a smartphone, wearable devices and the like. The server 14, in some embodiments, may be a computer server or a cloud-based infrastructure architecture.

The server 14 may include a memory storing user data. The memory of the server 14 may store user data, such as a user name, a password, and profile information. It will be understood that, in operation of the system 10, all of the users are anonymous, wherein no identifying information is provided to other users of the system 10 regarding any of the users utilizing the system 10.

The user computing device 12 may be coupled to the server 14, and, the server 14 may be programmed to receive a signal from the user computing device 12 that has accessed the system 10, wherein the signal includes user data having location information of the user computing device 12, such as by running a social communication app on the user computing device 12. The server 14 may then be programmed to process the user data, in response to receiving the signal from the user computing device 12, determine various users that have accessed the system 10 and are within a predetermined proximity to the user computing device 12, and create and send for display on the user computing device 12 a selectable element on the user interface for each of the various users, such as user interface 20 depicted in FIG. 3. For example, the interface 20 may include a depiction of the location of the user computing device 12, as indicated in FIG. 3. Others accessing the system 10 and in proximity (such as the proximity 24 between user computing device 12 and other user 22, depicted in FIG. 2) may be displayed on the user interface 20 as selectable users 26 by the user computing device 12 to engage in communication with other users. Accordingly, the server 14 may further be programmed to receive a signal from the user computing device 12 having communication data in response to selecting at least one user 26 from the various users 26 displayed on the user interface 20 on the user computing device 12, and process the selection and send for display on the user computing device 12, a communication interface for communicating between the user computing device 12 and the selected user 26. The users may communicate through text, multimedia messaging to even voice communication through the communication interface.

Figure 2:
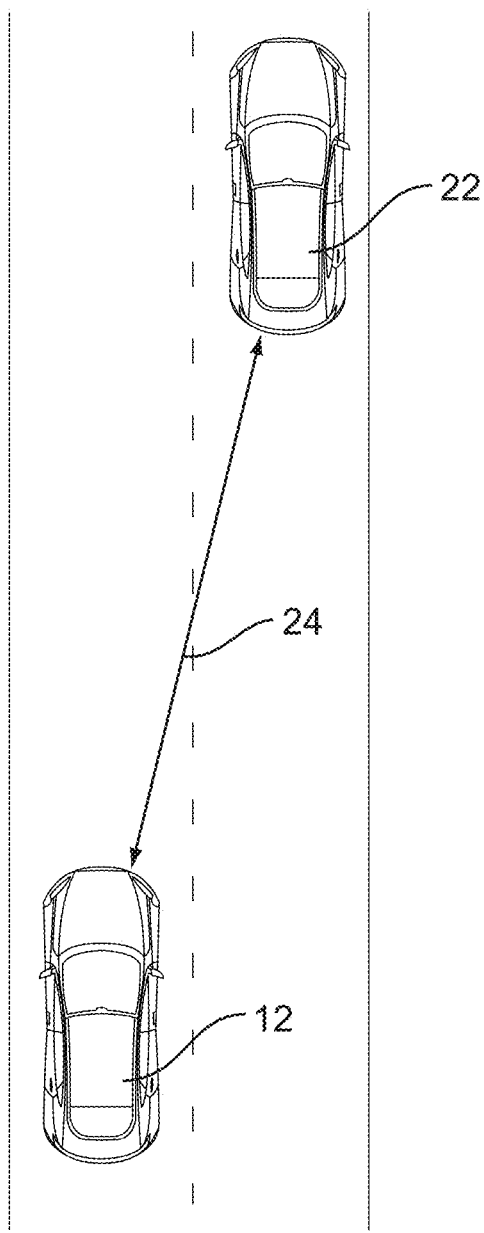
FIG. 2 is a top view of user computing devices within vehicles operating a social communication system according to an embodiment.
Figure 3:
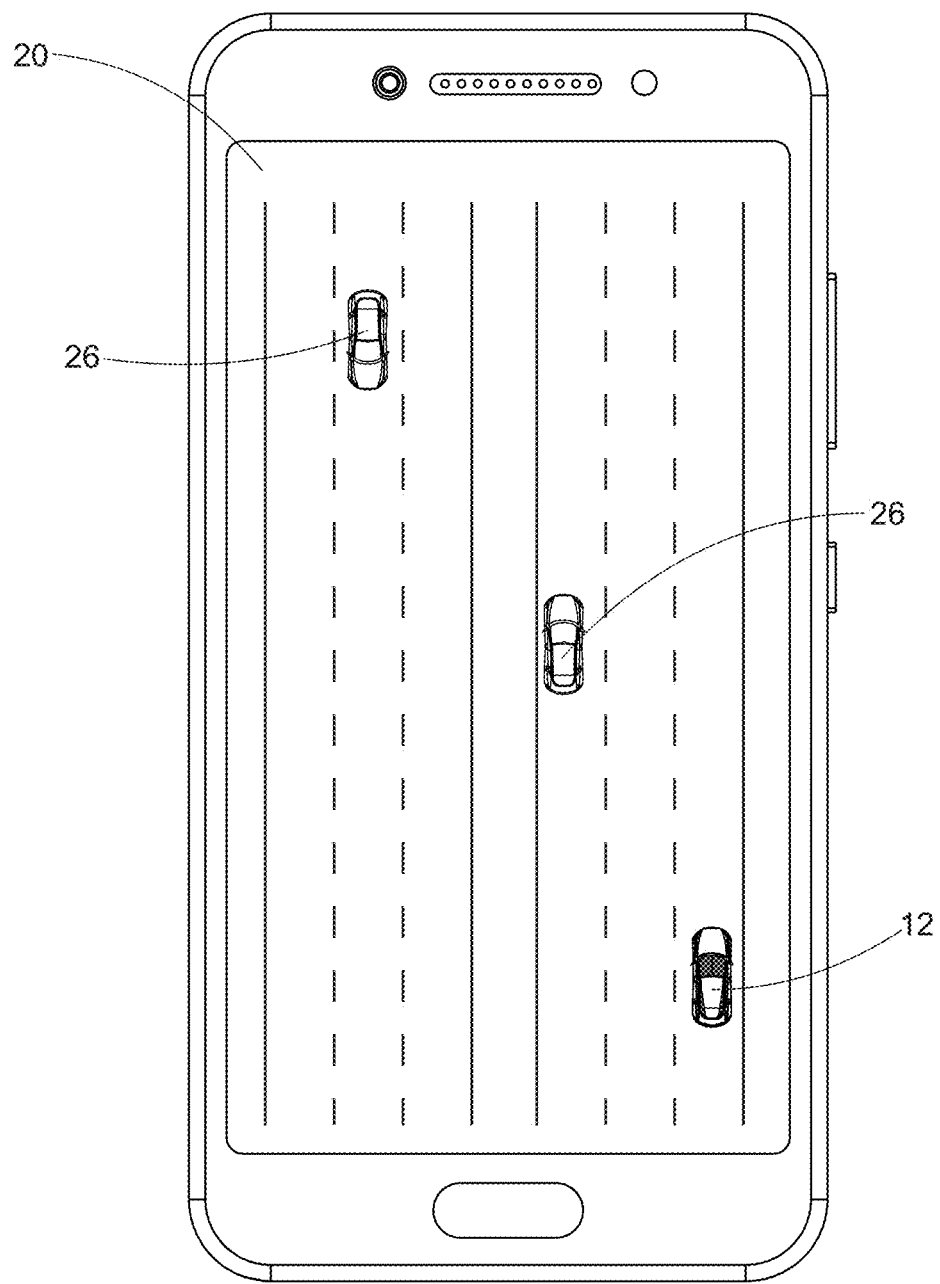
FIG. 3 is a user interface for using a social communication system according to an embodiment.
Figure 8:
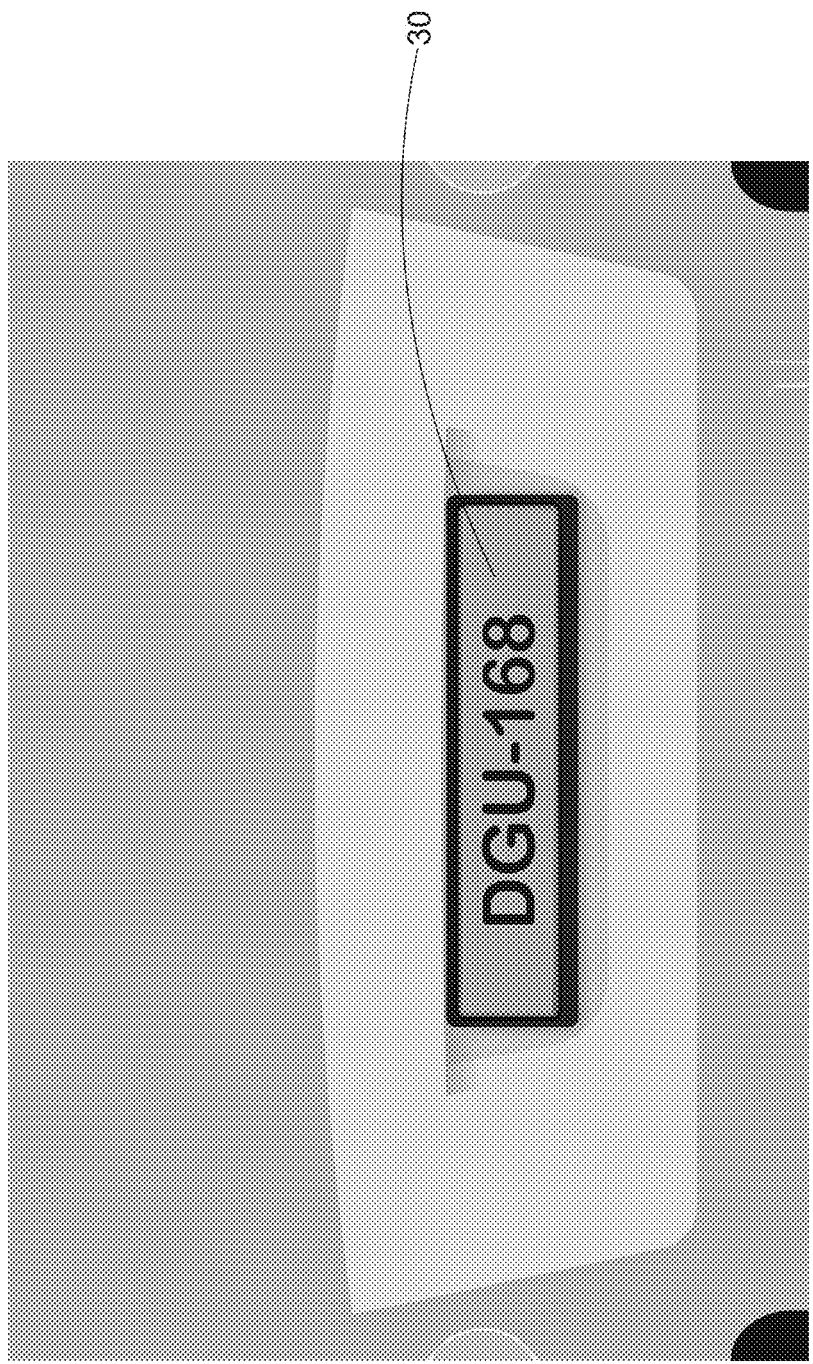
FIG. 8 is a rear view of a vehicle and license plate for use with a social communication system according to an embodiment.

Referring further to the drawings, FIGS. 2 and 8, a user may associate as part of the user data a license plate number 30, such as that depicted in FIG. 8. This allows users to engage the system 10 and establish communication with an anonymous user by entering the license plate number when in the predetermined proximity of the user computing device 12 and engage in communication with the anonymous user.

Figure 4:
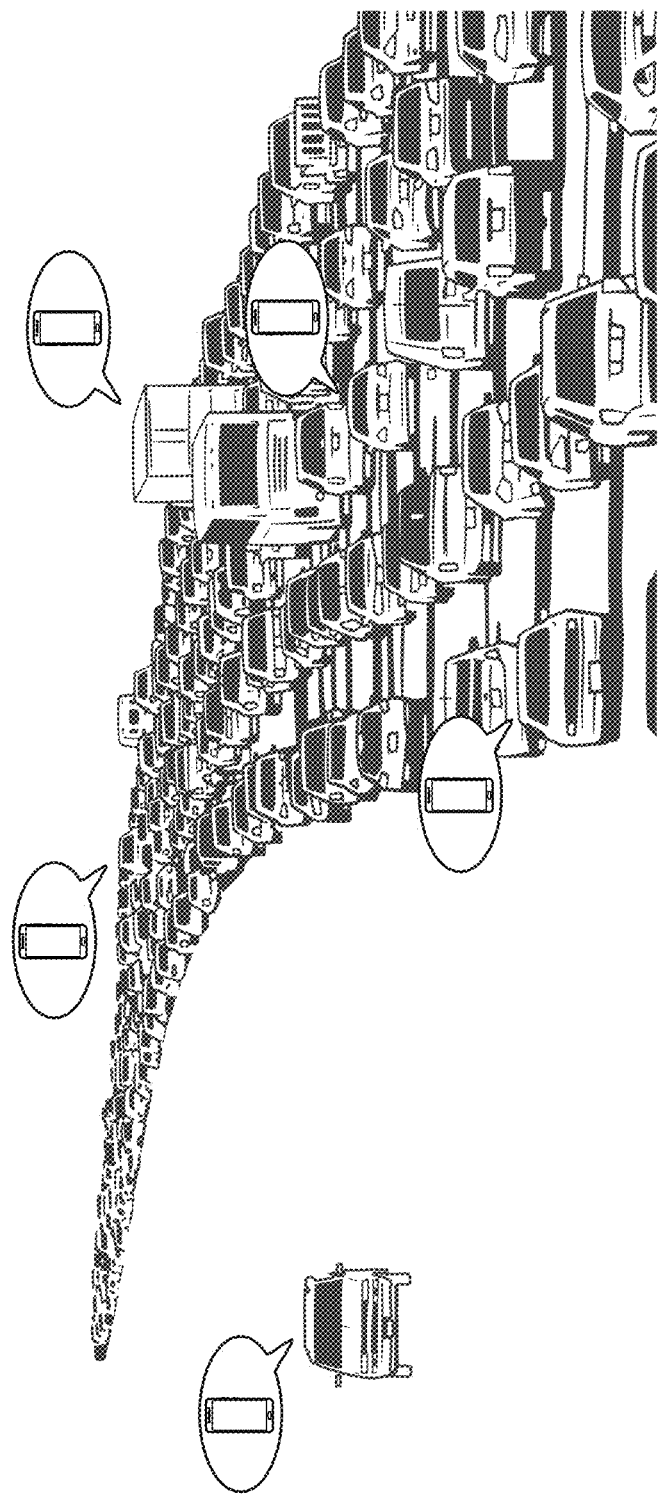
FIG. 4 is a perspective view of user computing devices within vehicles operating a social communication system according to an embodiment.
Figure 5:
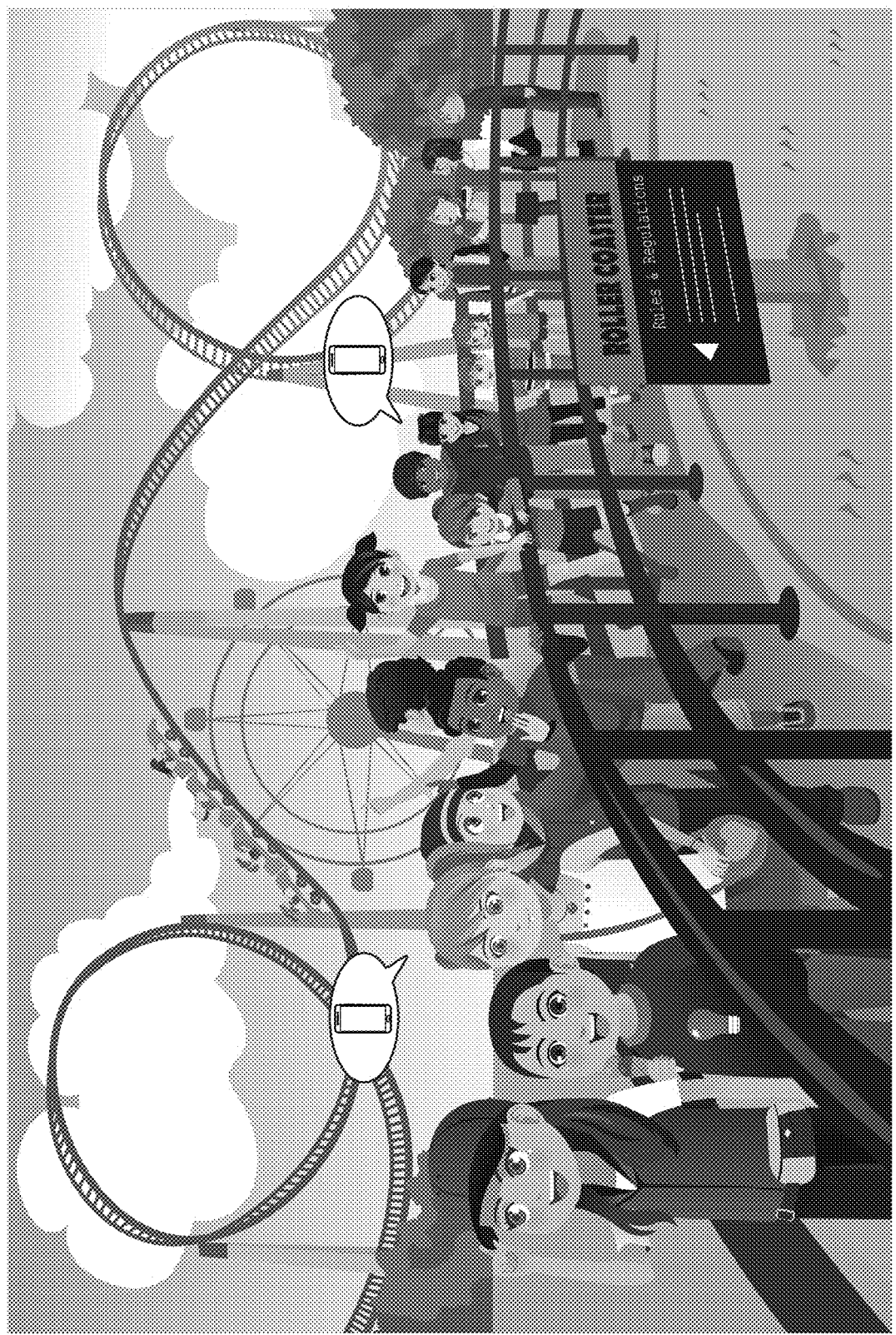
FIG. 5 is a perspective view of user computing devices used by individuals operating a social communication system waiting in a line according to an embodiment.
Figure 6:
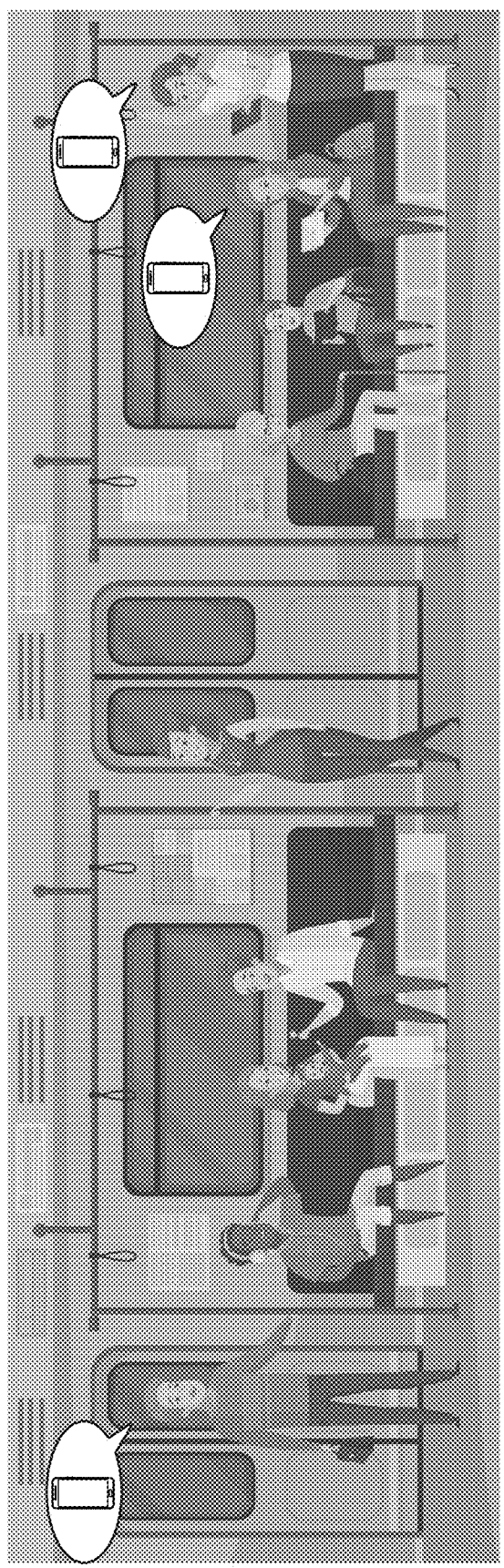
FIG. 6 is a perspective view of user computing devices used by individuals operating a social communication system on a train according to an embodiment.
Figure 7:
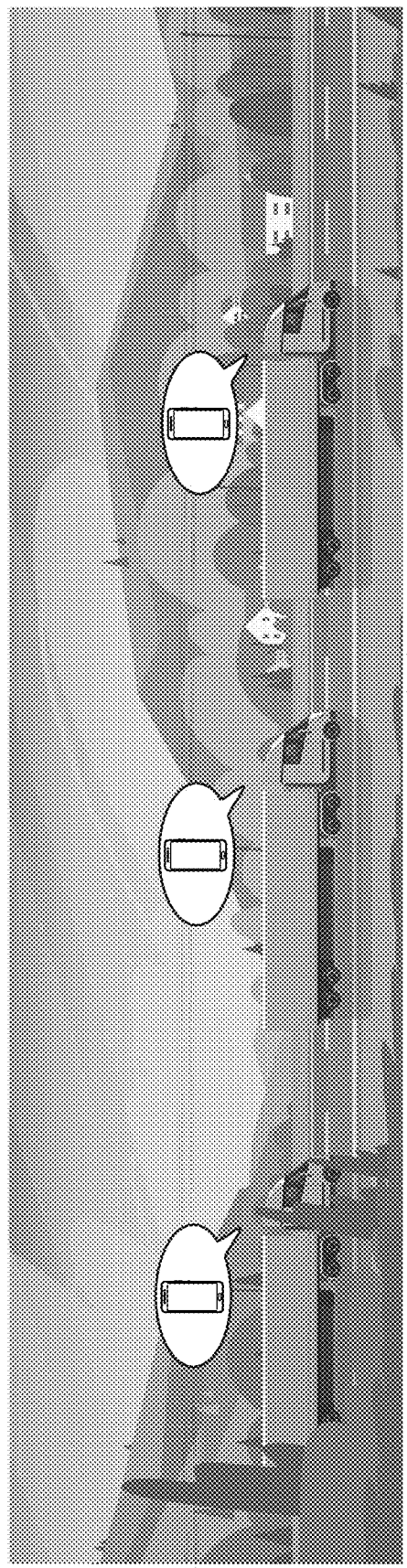
FIG. 7 is a perspective view of user computing devices within trucks operating a social communication system according to an embodiment.

Various uses of the system 10 are depicted in FIGS. 4-7. FIG. 4 depicts various vehicles that are engaged in the system 10, wherein several of the users are within a traffic jam and a car on the road heading a different direction is on an open road. The users may discuss what is creating the traffic jam and they do not need to know each other. FIG. 5 depicts individuals in a line at an amusement park engaging in conversation with the system 10. FIG. 6 depicts individuals on a train passing time by engaging in conversation with anonymous individuals. FIG. 7 depicts a series of trucks wherein the truckers are engaged in conversation with each other. It is contemplated that while the system 10 operates to keep users anonymous on the system 10 and the system 10 does not share identifying information of users, users may share identifying information using the platform provided by the system 10. For example, and without limitation, the system 10 may include users in any of the situations described in FIG. 4-7, or other similar situations. A user may choose to share with the other person they are communicating with to seek for in-person communication. For example people may be using the system 10 on a train and wish to sit together, or in line at an amusement park and want to talk, and so forth. Users can communicate personally-identifying information through the system 10, but the system 10 still is not actively sending user information.

Embodiments may be available on or through the internet, such as through domain names reserved and owned by Applicant that include hellozone.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A social communication system comprising:
   a server having a memory storing user data; and
   a user computing device coupled to the server, wherein the server is programmed to:
      receive an access signal from the user computing device that has accessed the system, wherein the access signal includes user data having location information of the user computing device;
      in response to receiving the access signal from the user computing device, process the user data and determine various users that have accessed the system and are within a predetermined proximity to the user computing device;
      create and send for display on the user computing device a selectable element on the user interface for each of the various users;
      receive a communication signal from the user computing device, the communication signal having communication data in response to selecting at least one selectable element from the various selectable elements displayed on the user interface on the user computing device;
      process the selection and send for display on the user computing device, a communication interface for communicating between the user computing device and a user corresponding to the selected selectable element.

2. The system of claim 1, wherein the communication interface is configured to allow communication between the user computing device and the user corresponding to the selected selectable element through a communication means selected from the group consisting of text, multimedia messaging, and voice communication.

3. The system of claim 1, wherein the user data includes a user name, a password, and profile information.

4. The system of claim 1, wherein the user data includes a stored license plate number.

5. The system of claim 4, wherein the communication signal includes an input license plate number entered into the user computing device, process the input license plate number, and send for display on the user computing device a communication interface for communicating between the user computing device and a user corresponding to the stored license plate number matching the input license plate number.

* * * * *